United States Patent [19]

Zurcher et al.

[11] Patent Number: 4,462,713

[45] Date of Patent: Jul. 31, 1984

[54] METHOD FOR MINING AND RECLAIMING LAND

[76] Inventors: Allen K. Zurcher, 509 N. High St., Greene, Iowa 50636; Wayne F. McFarland, 409 7th Ave., Charles City, Iowa 50616

[21] Appl. No.: 383,605

[22] Filed: Jun. 1, 1982

[51] Int. Cl.³ .......................... C02F 9/00; E02B 11/00
[52] U.S. Cl. ........................................ 405/36; 166/50; 166/250; 166/267; 210/170; 210/747; 405/52; 405/258
[58] Field of Search .................... 405/36, 52, 258; 166/50, 250, 266, 267, 370; 299/4; 210/170, 639, 652, 726, 747, 805, 901

[56] References Cited

U.S. PATENT DOCUMENTS

| | | | |
|---|---|---|---|
| 1,432,489 | 10/1922 | Osterberg | 405/36 |
| 1,878,295 | 9/1932 | Richmond | 405/36 |
| 1,895,324 | 1/1933 | Heacock | 405/39 |
| 3,649,533 | 3/1972 | Reijonen et al. | 210/170 X |
| 3,795,609 | 3/1974 | Hill et al. | 210/639 X |
| 3,941,422 | 3/1976 | Henderson | 299/4 |
| 3,976,569 | 8/1976 | Sheppard et al. | 210/726 X |
| 4,036,749 | 7/1977 | Anderson | 210/652 X |
| 4,074,754 | 2/1978 | Christian | 166/250 X |
| 4,114,693 | 9/1978 | Foster et al. | 299/4 X |
| 4,134,618 | 1/1979 | Kossack | 299/4 X |
| 4,167,973 | 9/1979 | Forte et al. | 166/267 |
| 4,176,057 | 11/1979 | Wheatley et al. | 210/170 X |
| 4,188,291 | 2/1980 | Anderson | 210/639 |
| 4,336,232 | 6/1982 | Moritz | 210/726 X |
| 4,366,063 | 12/1982 | O'Connor | 166/267 X |

Primary Examiner—George A. Suchfield
Attorney, Agent, or Firm—Breneman, Kane & Georges

[57] ABSTRACT

A combined method for mining and reclaiming land is provided for non arable saline and saline seep lands by utilizing subterranean drain pipe along with normal precipitation and irrigation waters to dissolve water soluble salts and minerals for collection in subterranean drain pipe and subsequently removing minerals and salts and thereafter purifying the water before discharging the water into rivers or returning the water back to the land for further circulation and percolation through the land to be mined and reclaimed. The combined land mining and reclamation method contemplates preventing saline seeps and returning land destroyed by saline seeps to arable conditions by mining collected subterranean water and the conversion of alkaline soils or salt flats to productive lands by the combination method of mining and reclaiming land to remove soluble salts that interfere with normal plant growth and the selection and utilization of salt resistant crops in various stages of the land mining and reclamation process of the invention.

33 Claims, 3 Drawing Figures

METHOD FOR MINING AND RECLAIMING LAND

BACKGROUND OF THE INVENTION

1. Field of the Invention

The present invention pertains to a combined process for the recovery of minerals and salts from non arable lands such as occur in alkali and alkaline soils while reclaiming and improving the land for agricultural purposes. More particularly, the invention relates to a combined process for mining and improving land for agricultural purposes and for the transitional development of the land from predominantly mining to predominantly agricultural purposes by the utilization of subterranean drain pipe to collect subterranean water from a recharge area and percolated waters from a swale or discharge area which incorporate dissolved salts and minerals which are mined from the collected water through chemical and physical treatments before the water is either discharged into the river or returned back to the surface of the land for topical application at either the recharge or discharge area to allow further circulation and percolation of the water through the land to dissolve and remove further soluble salts and minerals.

The invention contemplates the gradual return of non arable lands from land mining to agricultural purposes in a developmental progress in which a selection of plants and crops are utilized to assist in the transition from mining to agricultural stages of the invention. The water applied to the surface of the discharge area and the subterranean water from the recharge area is purified and recirculated and is utilized in conjunction with salinity measurements of the soil in the swale or discharge area as an indicator of the progress of the land in the mining and land reclamation aspects of the invention.

2. Description of the Prior Art

In recent years, over large portions of the States of Montana, South Dakota, North Dakota and the Canadian provinces of Alberta, Saskatchewan and Manitoba saline seeps have been developing to convert agricultural lands into non arable lands. Since the 1940's the saline seeps that have been developing in the Great Plains have resulted in about 80,000 acres of land being lost to production. The U.S. Soil Conservation Service estimates the rate of saline seep expansion is over 10% a year, which estimate does not include lands adjacent to the seeps that have been rising in salinity and have been exhibiting erosion effects from saline springs and saline damage due to run-off drainage from the seeps.

The problem of saline seep is distinct from the alkaline soil or the "salt flats" that have been historically alkaline soils that were the result of poorly drained areas in which the soil salts collected over the ages. The saline seep problem is a recent phenomena resulting from agricultural practices in which large acreage areas are allowed to remain fallow and the nature of crop plant roots in grain farming. Farm crops have rather short tap roots in comparison with indigenous plants of the plain which had tap roots that extended between 2 and 12 ft. into the soil. The replacement of the indigenous plants with wheat and other forms of grain in combination with fallow farming practices do not stem the downward seepage of water into the sub surface water tables resulting in a rise in the level of the water table. The indigenous plants of the Plains prevented the percolation and seepage of water down into the sub surface and the rise of the water tables and as a result, prevented lateral movement of salt laden water to form saline seeps on other areas. Traditional agricultural crops that have replaced the indigenous plants of the Plains also are not as resistant to the salinity of the swale or discharge area which forms a saline seep for which most vegetables, cereal crops, alfalfa, clover, and hay are unable to survive because of the high salt concentrations in the seep.

Saline seep water cannot be collected and discharged into streams because the alkalinity kills fish, endangers the dissolved oxygen in the water which favors toxic blue green algea and causes disease producing organisms to proliferate in the salt charged saline seep solutions. Saline seep water not only kills aquatic life but also is attributable to the deaths of birds and animals that depend on the river water. Consequently, it is not possible to collect and discharge these saline seep waters into the rivers and waterways.

The solution to the problem of saline seep has not been forthcoming and the closest available prior art pertains to methods for leaching or recovering ores from land utilizing leaching processes and the concentration of underground brine by solar evaporation. The prior art such as U.S. Pat. No. 2,563,623; U.S. Pat. No. 4,017,309; and U.S. Pat. No. 1,908,876 all pertain to various leaching and ore recovery techniques. These inventions utilize leaching, concentration, and recirculation but are significantly different than the present invention as these processes do not seek to return the land to an arable condition nor do these processes employ subterranean drainage for the purification of the water to return the land to arable condition.

In U.S. Pat. No. 3,966,541 a process for recovering chemicals such as chlorides, sulfates, carbonates, and borates from alkaline metals from underground brines is provided by utilizing a pond for solar evaporation of the water to concentrate the brine. In U.S. Pat. No. 3,966,541 the process concentrates and extracts these chemicals from areas such as the Mojave Desert where subterranean waters are collected and concentrated for subsequent removal of salts and minerals from the water but the land is not returned to arable condition nor is underground drainage utilized in a combined process to purify water and reclaim land for agriculture purposes. In U.S. Pat. No. 3,966,541 the testing of salinity of the soil in relation to the salinity of the combination of terranean and subterranean waters is not utilized nor does the prior art system employ water purification in the mining of the minerals of the present invention.

In U.S. Pat. Nos. 2,486,512 and 1,895,324 methods for promoting the growth of vegetation and irrigation systems are disclosed. These systems for promoting growth of vegetation and providing for irrigation do not provide for mining or the modification of non arable land to arable lands. The prior art patents alone or in combination do not teach or suggest the staged development of land from a mining use to agricultural use as is provided in accordance with the present invention.

The combination mining and land reclamation method of the present invention removes minerals and salts in a mining process which purifies the water and then discharges the water into a river or returns the water to the land for further mining operations. Since the return water can be applied to the surface of the land at either the recharge area or the discharge area the water can be completely or partially purified to suit the particular land conditions encountered. The combined method of mining and reclaiming land further contemplates periodic measurement of the salinity of the soil conditions in the discharge or swale in comparison with the periodic sampling of the subterranean collected water to determine whether the source of salinity is primarily from the recharge or discharge area. Where the recharge area is primarily responsible for the salinity of the subterranean waters the collected subterranean water may only be partially purified and returned to the recharge area to allow mining to continue without significantly interfering with the agricultural uses of the swale to control or provide the staged return of the land to an arable condition for agricultural purposes. The present invention not only assists in the elimination and control of saline seeps but more importantly in combination with the mining aspects of the invention makes the recovery, purification, and recirculation of the water economically justifiable while at the same time providing an existing drainage system to insure the maintenance of the land in the future for agricultural uses.

SUMMARY OF THE INVENTION

The disadvantages and limitations of the prior art in providing for a complete process for both mining and reclaiming land for agricultural purposes is achieved by the present invention which combines both drainage technology with mining technology to allow land to be reclaimed for agricultural purposes. The novel method of the present invention utilizes drain pipe to collect subterranean water responsible for saline seep and the terranean water applied to the surface of the discharge area and provides for the purification of the collected water and the subsequent circulation and application of the purified water to the surface of the recharge or discharge area in combination with the application of specially selected plant life to return the land to its agricultural uses.

The present combined method of mining and reclaiming land of the invention is applicable to either existing salt lands or to recently destroyed agricultural lands due to problems of saline seep where the combination of agricultural and mining uses of the land can be economically justified. Once the process of the present invention is initiated, the staged transition of the land from mining to agricultural uses or the mining of the salt laden glacial till of the recharge area can continue until mining is completed and the land is ready for complete agricultural use. The mining of the recharge area while growing crops in the swale assures that once the land is returned to purely agricultural uses salt from the recharge area will not later damage the swale. This transition to entirely agricultural purposes still provides the advantage of having a subterranean system of drainage to insure the proper drainage of the land and maintain the agrictural uses of the land.

The combined method of mining and reclaiming land contemplates the installation of a sub surface drainage system capable of collecting precipitation and terranean waters applied to the surface of the land containing the subterranean drain pipe, which terranean waters percolate to the water table along with subterranean water and both are subsequently collected for mining and purification in accordance with the invention. Once the collected water has been mined and purified it can be returned to the surface of the land at the recharge area, discharge area or discharged into rivers or streams. In final stages of the return of the land to agricultural purposes the purified water would preferably be returned to irrigate the planted crops to further hasten the return of the land to agricultural purposes.

The sub surface drainage system would preferably be installed in a depth of about 4 to 6 ft. below the surface of the ground with lateral lines running parallel to each other for distances of 30 to 100 ft. or more depending on the configuration of the swale area and be connected to a main drainage line that would outlet into a processing area. Preferably, the drainage lines would be placed on a grade to allow gravity to transport the collected waters to the processing plant. The precise disposition and configuration of the drainage lines would, of course, vary with ground conditions such as available grade, water table, salt concentrations, and the amount of water coming from subterranean sources and the ability of terranean waters to percolate through the soil in the swale discharge area.

As has been discovered in practice, a 4 inch diameter corrugated plastic drainage line having a main line of 1,277 linear ft. in length placed on a grade of 3% on the lower one half and a grade of 2.5% on the upper half with one lateral line running perpendicular to the main line with a length of 606 linear feet placed at a grade of 1.5% all of which was disposed below the ground at an average depth of 5 feet yielded a discharge rate of approximately 100 gal. of water per minute. The discharge of water of the 100 gal. per minute rate lasted approximately one week. At the end of 45 days, the outlet discharged at a rate of 1.2 gallons per minute because of dry weather conditions and the water collected was not returned to the surface of the land. In the preferred installation drainage pipes of corrugated polyethylene was used having slots cut between corrugations which were covered with a nylon mesh filter to prevent soil particles from entering the tubing.

The subterranean drainage may utilize corrugated plastic tubing with saw slots and nylon filters or the utilization of clay drain tile, concrete drain tile, corrugated metal pipe, smooth wall metal or plastic pipes or various types of material available in the art to collect water and convey subterranean water which can employ the force of gravity or a pump. The drainage tile can be installed utilizing trenchers, mole plows or other devices commonly utilized for the installation of subterranean pipes.

The drainage pipes collect the subterranean waters which are primarily responsible for saline seep and precipitation or irrigated waters applied to the surface of the swale that percolate through the soils and combine with the subterranean water. Although the specific chemical makeup of the salts and the various soils in areas differ, the problems of subterranean seep are similar in restricting crop yield or causing crops to fail in many places. The run-off water from the subterranean seep generally contain salts that are in many cases toxic and also pollute rivers and streams and pose dangerous health hazards for both man and animals. Saline seeps once started often increase in size as much as 10% per year resulting in serious reduction and elimination of the crop.

One example of an area affected by saline seeps, is the Highwood Bench area in Montana. The Highwood Bench area has lost approximately 10% of the arable land or 12,000 acres to saline seeps. Water collected and tested from saline seeps in the Highwood Bench area shows a total dissolved solids content in the range of 28,000 to 52,000 mgs/l (milligrams per liter) with specific conductivities in the range of 24,000 to 40,000 micromhos per centimeter. Under such saline conditions only a few salt tolerant plants are able to grow when the ground water conductivities exceed 16,000 micromhos per centimeter. Concentrations of alkali salts found in the soils of the Highwood Bench area range from 3 to 12% with an average of 4%.

The average 4% salt level in soil indicates approximately 100,000 lbs. of salt are present per foot acre in the Highwood Bench area. It is been found that the most common salts are sodium and magnesium sulfates and that magnesium sulfate ($MgSO_4.7H_2O$) is the predominant salt in the saline seep soils. Magnesium sulfate has a fairly high solubility of 262 grams per liter and as a result, it is easily leached from the soil and is concentrated in the water table. Magnesium sulfate is highly toxic to plant life and in view of a relatively high concentration of about 3,000 to 4,000 mg. per liter, as opposed to sea water which contain approximately 1,300 mg. per liter, is practical to mine commercially from the saline seep water.

The present combined method of mining and reclaiming land of the invention contemplates the collection of the saline seep and its treatment to first remove available calcium as calcium carbonate to prevent contamination of the magnesium. One such method of pretreating the saline seep to remove available calcium as calcium carbonate would be to treat the raw saline water with sodium cabonate and sodium hydroxide to remove calcium carbonate. Thereafter, magnesium can be removed as magnesuim hydroxide by treating the solution with sodium hydroxide to precipitate and remove the magnesium hydroxide from the filtrate for further treatment. Calcium hydroxide or lime is then added to the resulting filtrate to remove the calcium sulfate as gypsum. The magnesium hydroxide and calcium sulfate both have commercial uses which make the mining of the saline seep water economically justifiable.

Once the major initially minable products are removed, sodium carbonate is then added to the filtrate to remove excess calcium as calcium carbonate before the filtrate is subjected to reverse osmosis, ion exchange or electrodialysis to provide fresh water that can be returned for topological application or irrigation of the water to the surface of the land at either the recharge area or discharge area or the water can be discharged into rivers or streams.

In the initial stages of land reclamation in many areas the mining aspects of the invention will predominate where the concentration of the saline seep has a conductivity of greater than 16,000 micromhos per centimeter. At these concentrations, only a very few salt tolerant species of indigenous range plant can survive. In such saline seep conditions land reclamation in accordance with the invention would predominantly utilize the mining aspects of the invention and the planting of indigenous weeds of the Plains such as Kochia, often referred to as fire weed or summer cypress and fox tail, barley salt grass and other highly salt resistant native plants that provide deep rooting systems. Under particularly adverse conditions the utilization of trees such as Tamarix, Pentandra along with salt grass, pickle weed, seep weed and kochia may be utilized in the process of recycling water to the land and returning the land to an arable condition while the mining continues through the collection and purification of subterranean water and the terranean water.

Once mining has continued until the conductivity reaches a level of less than 16,000 micromhos per centimeter salt tolerant crops such as date palm, asparagus, kale, beets, barley wheat grasses, wild rice, Rhodes grass, Bermuda grass and some varieties of cotton could be replanted while the mining and land reclaiming continues to remove the water soluble salts from the land to return the land to a predominantly agricultural condition.

It has been discovered that many alkali soils do not permit water to readily percolate through the soil when applied to the surface. Under such conditions it is advantageous to utilize plant life with wide branching roots in addition to plants having deep tap roots to assist in the dispersion of the water returned to the surface of the soil. It has also been discovered that various chemical wetting agents or conditioners can be used alone or in combination with plant life to further assist in the return of the land to an arable condition. Such chemical soil conditioners or wetting agents are utilized to ionize water and accelerate the percolation of the water through the soil and are available through Amway or through Mid-County Chemical of Kansas City, Mo. and sold under the trade name of Special Wet. These soil conditioners in combination with various forms of soil cultivation assists in allowing the purified water to enter the soil and aerate the soil and dissolve salts in the soil to assist in their recovery in the combined mining and land reclamation aspect of the invention. Plants with medium to large tap roots are also desirable since they create fissures in the soil which also assist in loosening the soil particles to allow water to percolate through the soils. Such plants with or without conditioning agents may be utilized in the staged return of the land to agricultural purposes.

Irrigation or the recycling of the purified water to the land may be utilized in accordance with the invention to assist the plants grown on the land depending upon the stage of the land reclamation project. Any workable irrigation system is sufficient with the preferred type of irrigation depending upon the available energy to provide for the operation of the irrigation. In early stages, where it is difficult if not impossible to grow plants on the land to be reclaimed the purified water can be discharged into rivers or streams without adverse affects to the river or streams since the processes of ion exchange, electrodialysis or reverse osmosis would return the water to a potable condition.

The advantage of combining an irrigation system with the method of mining and reclaiming land would be to speed up the land reclamation process and mineral recovery by reducing the salinity of the soil. The mining part of the present invention would provide salts from which magnesium, selenium, strontium, lithium and calcium could be recovered. The recovery of calcium sulfate would also be a source of gypsum which also could be readily processed, recovered and provide a commercially feasible source for this product. In addition the present method of pretreatment of the raw saline seep by the precipitation of calcium sulfate in settling tanks or treatment ponds to provide a ready source for this compound before ion exchange or reverse osmosis processing.

The combined mining and land reclamation process of the invention would in its preferred mode utilize a plastic lined holding pond or tank to prevent the penetration of the brackish collected drainage waters from penetrating into the ground. The water in these holding ponds or tanks could then be periodically diverted into further tanks for treatment with sodium carbonate $Na_2CO_3$ and sodium hydroxide $Na_2OH$ to react with the calcium in the brine and form calcium carbonate which could be precipitated or filtered out of the solution from the bottom of the pond or holding tank. The filtered solution or mother liquid could then be transferred to another holding tank or pond where additional sodium hydroxide would be added to precipitate out magnesium hydroxide which would be collected and thereafter processed to produce magnesium metal. The mother liquid or filtered solution could then be transferred to a further tank or holding pond and calcium hydroxide would be added to precipitate further calcium as a calcium sulfate. The drained off mother liquid or filtrate could then be transferred to a further holding tank or pond and treated with sodium carbonate to remove excess calcium as a calcium carbonate precipitate before the water is further purified or returned to the recharge or discharge area depending upon the soil salinity in the respective areas.

After pretreatment the water can be purified to a potable condition by utilizing such techniques as ion exchange or electrodialysis to remove the final salts. Reverse osmosis may also be used to remove final salts and material from the water to provide fresh water and concentrated brine which can further be utilized to obtain metals such as lithium, selenium, strontium and other commercially valuable metals from salts that have been removed from these solutions by the reverse osmosis process. The fresh water could either be returned to the surface of the land for percolation through the ground to dissolve further salts or discharged into rivers or streams.

It has been found that reverse osmosis is presently the most economical and efficient system for the removal of metal and salts and providing fresh water since it is energy conscious, versatile, and less prone to scaling after the water has been pretreated to remove the calcium carbonate and magnesium hydroxide and calcium sulfate to prevent the over loading of the reverse osmosis system. Efficient pretreatment processing can remove approximately 95% of the solids in the brackish water to provide a solution which reverse osmosis can readily clean without over charging the reverse osmosis system in the final step of providing fresh or potable water that can be discharged into a stream or returned to the land for further dissolving of salts contained in the soil.

It will be recognized that particular topological features of the land and of the water table and condition of the land need to be considered in practicing the method of the present invention. For example, the reclamation of land that has just begun to show the effects of saline seep can best be saved by collecting the subterranean water responsible for the seep and the mining of water and returning the clean water to the land without extensive modification of existing plant or crop life. In such areas the top soil has not been saturated with salts and the problem mainly pertains to the removal or mining of the underground water to prevent its contamination and seeping into existing agricultural land. On the other hand, where saline seep has already changed the conductivity of the soil, and introduced salt compounds into the soil then a modification of the crop in combination with the mining and purification of the subterranean waters from a recharge area will be required to control the saline seep. In either case, the combined method of the present invention contemplates the collection of subterranean waters and waters applied to the surface area to prevent further seep and to return any damaged surface land to arable conditions.

The features of the invention allows land to be simultaneously mined and reclaimed. The monitoring of the surface conductivity of the soil in the area of the discharge area of the land being reclaimed in combination with salt content of the collected waters provides information as to whether the concentration of salts collected by the subterranean drainage is primarily the result of the removal of salts from the swale or discharge area or whether salts are predominantly from the subterranean water that has migrated from an upland recharge area.

This information can be utilized to more precisely select and adjust the moisture conditions of the crop planted in the reclaimed area while continuing the mining process by the collection of the subterranean waters to prevent salts from seeping into the soil of the discharge area to destroy the root systems of the existing or selected crops. Moreover, as a consequence of the range of adaptability of the combined method of mining and reclaiming lands the application of topical moisture or terranean water to the surface of the land being reclaimed can be precisely controlled. Under such circumstances if the brackish water is primarily the result of subterranean channels from an upland recharge area the water from the saline seep or swale discharge area can be transported to the upland area to remove minerals until such time as the salts in the salt laden glacial till of the recharge area is depleted and normal precipitation or water added to the upland recharge area does not result in appreciable saline seep. In this manner, the existing drainage lines placed in the saline seep area can be utilized to control, monitor and prevent the loss of arable land while mining and reclaiming the saline seep area.

DESCRIPTION OF THE DRAWINGS

Other advantages of the invention will become apparent to those skilled in the art from the following detailed description of the invention in conjunction with the accompanying drawings in which.

DETAILED DESCRIPTION OF THE INVENTION

Figure 1:
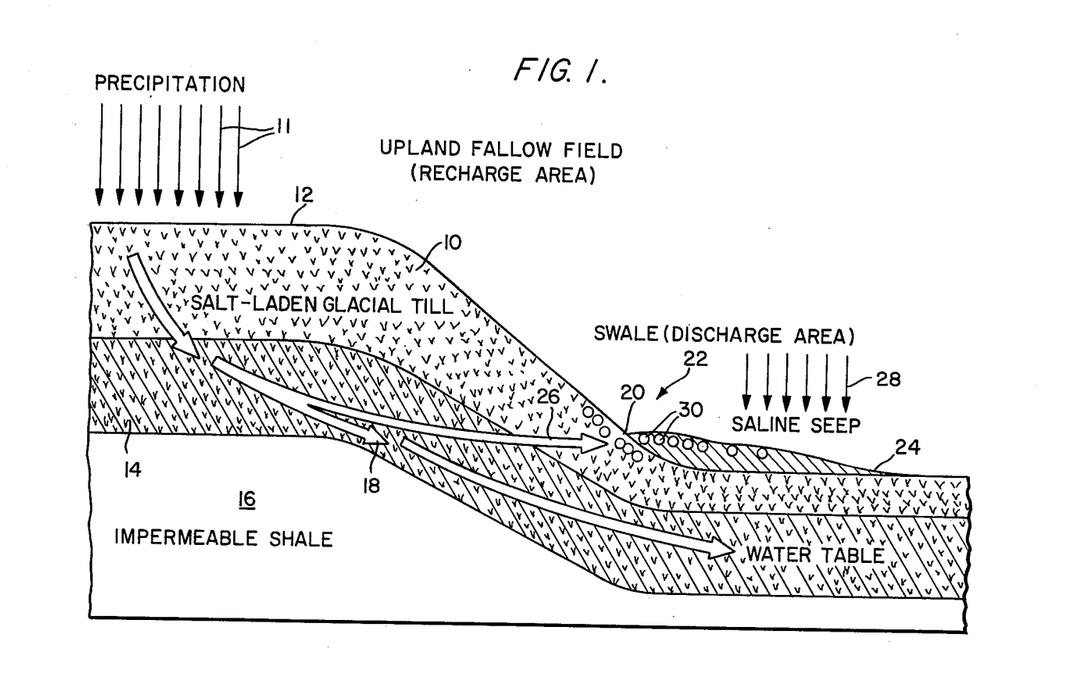
FIG. 1 is a cross sectional view of an area of land illustrating the formation and the mining and reclamation of a saline seep.

Referring now to FIG. 1 the combination mining and land reclamation method of the present invention will be described with regard to the mining of a saline seep. Saline seeps are formed by the dissolving of water soluble salts in a salt laden glacial till 10 located in upland recharge area 12 that percolates through the top soil salt laden till 10 before reaching a water table 14 disposed between the salt laden glacial till 10 and a layer of impermeable shale 16. The salt laden waters from recharge area 12 flow with the water table 14 downhill in the direction of arrow 18 until they re-surface through soil 20 located in a swale or discharge area 22 to form a saline seep or saline seep area 24. The combined method of mining and reclaiming land in the saline seep area utilizes the installation of drain pipe 30 in saline seep 24 to collect the subterranean waters represented by arrow 26 which are discharged through the land in the discharge area.

Figure 2:
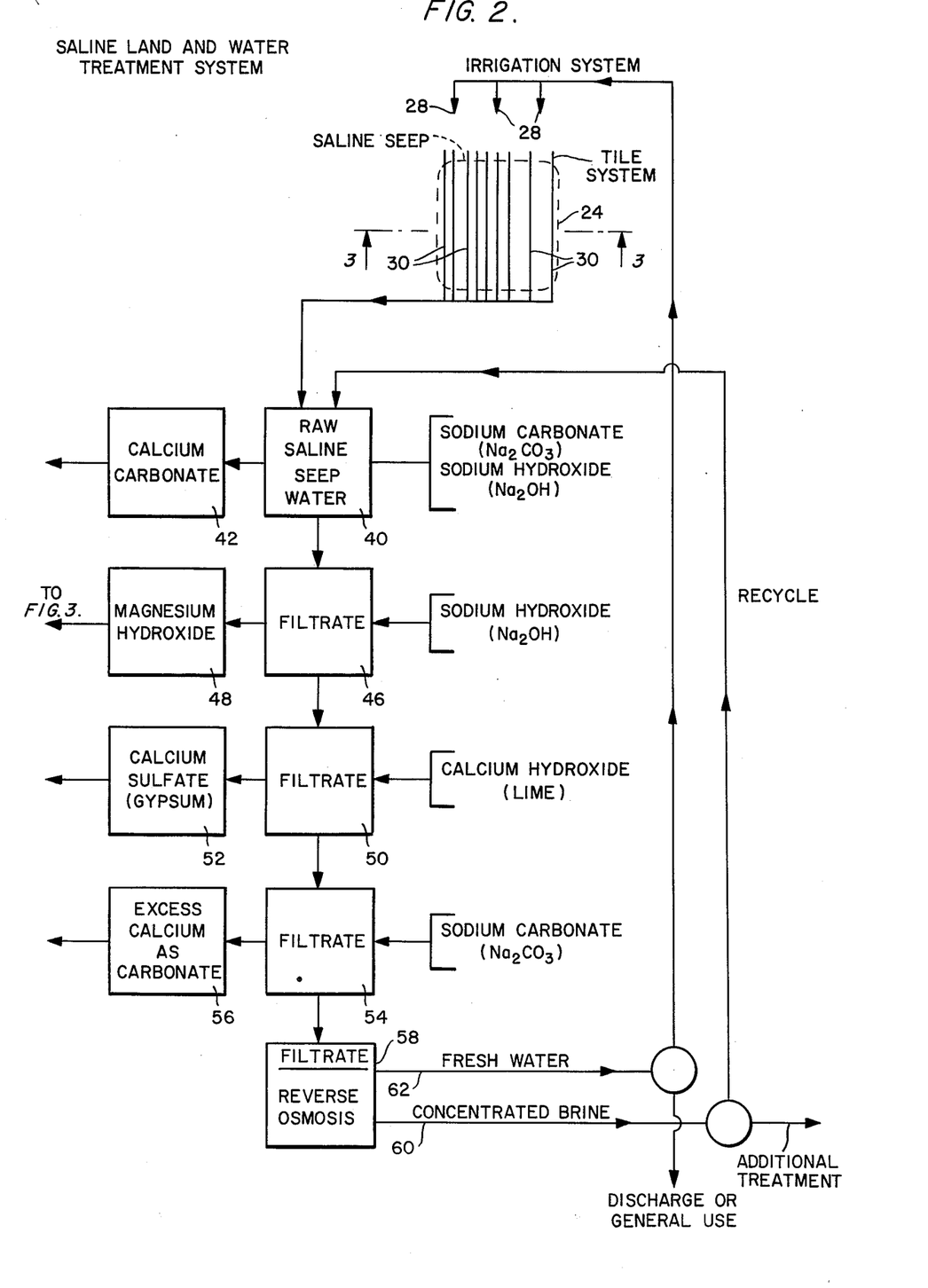
FIG. 2 is a flow chart illustrating the mining of a saline seep area by the utilization of drainage tile and the collection and processing of the raw saline seep to provide fresh water in accordance with one embodiment of the invention.

The salinity of the saline seep area 24 is dependent not only upon the salt content of the soil in the upland recharge area 12 but also on the length of time the saline seep 24 has remained in existence. A relatively new saline seep 24 generally does not have a high salt content and in such areas the relatively salt laden subterranean waters represented by arrow 26 can be collected and mined to prevent the formation of a saline seep by drain pipe 30. The subterrarean water can then be collected and mined without interfering with the agricultural utilization of the land as is illustrated in FIG. 2 and as will be described hereinafter in greater detail.

The length of time that saline seep 24 has been in existence in combination with the salinity of the top soil of saline seep 24 in addition to the salt content of the salt laden glacier till 10 will affect the arable condition of the land in saline seep 24 and dictate whether saline seep 24 can be utilized for concurrent agricultural purposes. The comparative salinity of the recharge and discharge areas, their size, and the type of dissolved salts are important in determining if concurrent agricultural uses and the type of agricultural uses that may be possible. Where it is desirable to return the land to arable condition as quickly as feasible, certain salt resistent crops may be grown on the swale along with the addition of soil conditioners as will be described hereinafter in greater detail.

In applications of the present invention in which the subterranean waters in water table 14 are particularly laden with salt soluble substances or where the land in the saline seep area 24 has conductivity values far in excess of 16,000 micromhos per centimeter that preclude plant life, then the mining aspects of the present invention may be utilized by returning treated or partly treated water to either the saline seep or discharge area 22 or the upland recharge area 12. In such cases calcium carbonate, magnesium hydroxide and calcium sulfate may be removed from the water before returning the water to the recharge area 12 or to the saline seep 24 or a combination thereof. As the salinity of the collected waters and conductivity of the land in the saline seep area subsides crops can be planted and reverse osmosis, electrodialysis or ion exchange can be utilized to further purify the water for application to the saline seep area 24. At that time the periodic monitoring of the conductivity of saline seep area 24 along with the salinity of the water collected in drain pipe 30 can be compared to determine the relative salinity of the subterranean water in comparison to the salinity of the soil in discharge area 22 which can be utilized to determine the necessary purity of the water that is to be applied topologically to the saline seep area 24 as is represented by the arrows 28 (FIGS. 1 and 2).

Once the saline seep area 24 is reduced in conductivity and salt content, crops can be planted that are resistant to salinity which further assists in the reclamation of the land to arable purposes. In recent years, the problem of saline seep has been aggravated by the removal of deep rooted indigenous plants and the crop rotation techniques of the Great Plains Grasslands which results in excess water being produced by moisture conservation techniques resulting in significant losses of land to saline seeps over a large portion of Montana, South Dakota, North Dakota, and the Canada Provinces of Alberta, Saskatchewan and Manitoba.

The salt laden glacial till 10 is up to 70 ft. in thickness and lies between the top soil layer and a bed of impermeable shale. The excess water which drains through the glacial till leaches out soluble salts which in combination with a rising water table results in the surfacing of the ground water as a saline seep. The most common salts in the glacial till are sodium and magnesium sulfates. The chloride levels are very low and nitrates are present in concentrations sufficient to warrant health concerns. Calcium and potassium are found in lesser quantities with other elements such as iron, aluminum, copper, selenium, strontium cadmium, lithium, beryllium, and boron being detectable only in minor concentrations.

The predominant salt in the glacial till is magnesium sulfate ($MgSO_4.7\ H_2O$) which has a relatively, high solubility of 262 grams per liter and is relatively easily dissolved in the soils and concentrated in the water table. Magnesium sulfate is highly toxic to plant life and is generally tied up or co-crystallized with other salts. As a result, the reclamation of magnesium sulfate requires considerable application of water to dissolve the magnesium sulfate that is tied up with other salts. Other salts present in the raw saline seep brine are potassium sulfate and sodium chloride which is present in low levels but is also highly toxic to plant life. Another predominant salt in the glacial till is sodium sulfate which during warm months dissolves fairly readily but as temperatures decrease, solubility of sodium sulfate decreases in the winter months to a point where the sodium sulfate dissolves with great difficulty. As a result, the mining and reclamation of lands in accordance with the present invention in some cases requires a number of years and the application of large quantities of water during the warm seasons of the year.

In addition to the salinity of the soil, soils in the saline seep area have exhibited fairly high levels of conductivity. These levels of conductivity are related to the salt content of the seep area and are important in selecting crops to be grown in the saline seep area during the combination of mining and land reclamation of the present invention. Soils are generally considered saline if the conductivities are greater than 4,000 micromhos per centimeter. Specific conductance levels of samples collected in accordance with the present invention have ranged in the area of about 30,000 micromhos per centimeter as will be discussed in Examples hereinafter in greater detail.

Soil having specific conductance levels of over 16,000 micromhos per centimeter allow only a few salt tolerant plants to grow. The present combined mining and land reclamation method of the present invention contemplates the reduction of the conductivity and salinity content of the land by collecting the subterranean waters primarily responsible for the saline seep and providing irrigation and the topical application of terranean waters of irrigation waters over the surface saline seep area to percolate through the saline seep to dissolve and remove salt from the saline seep area which is also collected in the subterranean drain pipes.

In some cases plants can be introduced to assist in the aeration of the soil.

The addition of non agricultural crops or specialized crops in the reclamation of the land depends upon the specific conductance of the saline seep area. In low specific conductance saline seep areas the present method of mining the subterranean waters to prevent further contamination of the swale or discharge area is possible. Under such conditions the normal crop can be planted in the saline seep while the subterranean waters are mined, purified and returned to topological application to the surface of the saline seep. In those areas however, where the saline seep is extensive and conductivity is especially high, plants can be added to the seep area in accordance with the plants resistance to specific conductance. Table 1 illustrates the response of various types of crops to various levels of specific conductance.

TABLE I

| Crop Response To Salinity Conductivity at 25° C. of the Saturation Extract | |
|---|---|
| (micromhos/cm) | Related Crop Response |
| 0–2000 | Negligible saline effects |
| 2,000–4,000 | Restricted yields of sensitive crop cover: avocado, citrus, strawberry, peach, apricot, almond, plum, prune, apple, pears beans, celery, radish clovers, meadow foxtail |
| 4,000–8000 | Many crops are affected when restricted yields: Sensitive-grape, cantaloupe, cucumber, squash, peas, onions, carrot, bell pepper potato, sweet corn, lettuce More tolerant-olive, fig, pomagranate, cauliflower, cabbage, broccoli, tomato, oats, wheat, rye, alfalfa, sudan grass, perennial rye grass, sweet cloves, strawberry clover, dallis grass, flax, corn, rice. |
| 8,000–16,000 | Satisfactory yields only from salt tolerant crops: date palm, asparagus, kale, beets, barley, many species of wheat grasses and wild ryes, Rhodes grass, Bermuda grass, salt-grass, some varieties of cotton. |
| 16,000 | Satisfactory yields from a few very salt-tolerant species of some native range plants |

Figure 3:
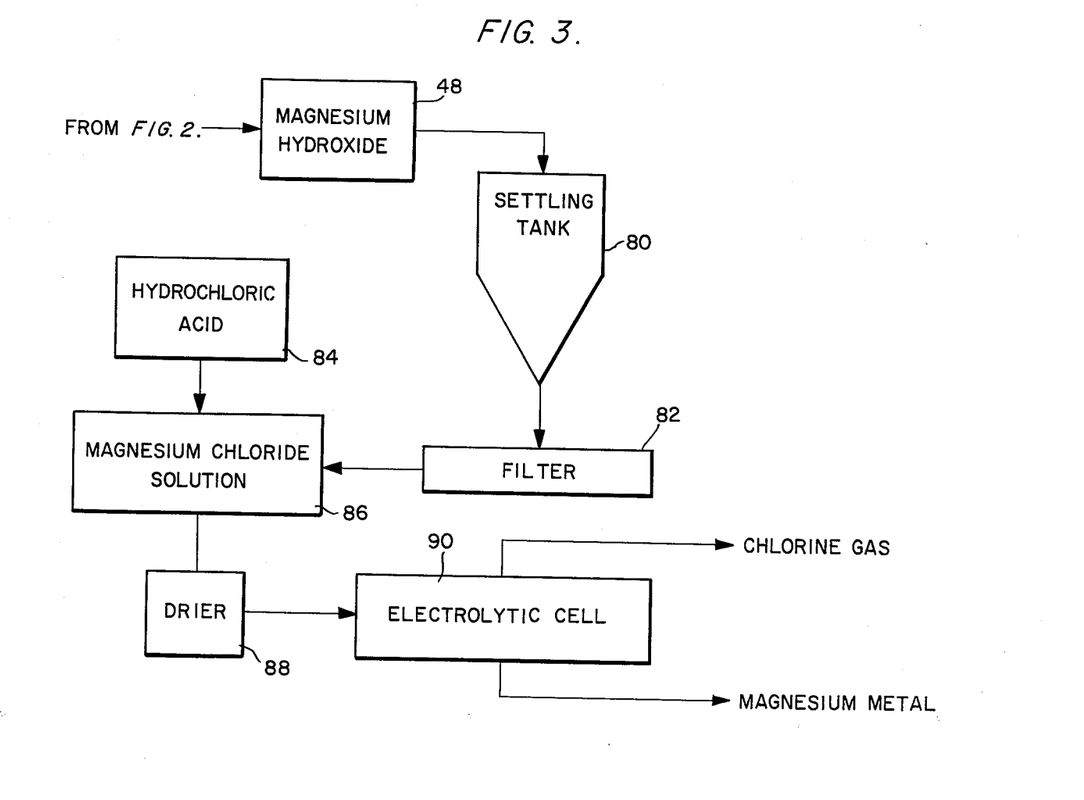
FIG. 3 is a flow chart illustrating the further processing of magnesium hydroxide to recover magnesium metal.

Referring now to FIGS. 2 and 3, the combined method of mining and reclaiming land is illustrated in which a saline seep is controlled by the utilization of drainage pipe 30 to collect terranean and subterranean waters from a saline seep 24. The subterranean waters from water table 14 as represented by arrow 26 (FIG. 1) is collected by drain pipes 30 along with terranean water supplied from irrigation source arrows 28. Raw saline seep water that has been collected from areas in Montana as will be set forth hereinafter in greater detail in Examples contains more dissolved solids than sea water. Sea water typically contains about 36,000 mg. per liter of total dissolved solids whereas the total dissolved solids of brackish waters collected in sample areas have been as high as 49,700 mg. per liter.

The collected raw saline seep water as represented by block 40 is then treated with sodium carbonate and sodium hydroxide to remove calcium carbonate as represented by block 42 to prevent contamination of the magnesium hydroxide salts. As has been discussed, raw saline seep water can be collected in a first pond or tank and thereafter fed to a processing tank for treatment with sodium carbonate, sodium hydroxide to precipitate out the calcium carbonate which may be filtered or settled out from the remaining liquid which can then be transferred to a second tank for the removal of magnesium by the precipitation of magnesium sulfate as magnesium hydroxide by the treatment of the filtrate represented by block 46 with sodium hydroxide to precipitate out the magnesium hydroxide represented by block 48 which is subsequently treated and reduced to magnesium metal in a process that will be described hereinafter in greater detail.

The mother liquid or filtrate 50 may then be treated with calcium hydroxide in a separate tank or area to remove calcium sulfate as is represented by block 52. The resulting mother liquid or filtrate 54 is then treated with sodium carbonate to remove all excess calcium as a carbonate as is represented by block 56 with the remaining water being treated by reverse osmosis as is represented by block 58. As will be recognized, the final treatment of the filtrate 58 by reverse osmosis is not necessary where the saline seep area 24 has such a high level of specific conductance that crops will not grow. In such cases the filtrate 58 could be recirculated to the saline seep 24 or to the upland recharge area 12 for further circulation through the ground and for collection in drain pipes 30 and further processing. In cases where the chemically pretreated saline seep water has a specific conductance of below 2,250 micromhos per centimeter, it could be returned directly to the saline seep area without major effect upon some salt resistant crops.

In the preferred embodiment of the invention the filtrate 54 is treated by reverse osmosis to provide fresh water having a total dissolved solids content of about 665 milligrams per liter and provide a concentrated brine having a 12.4% total dissolved solids as is represented by line 60. Fresh water from the reverse osmosis unit may be transported by line 62 to the irrigation system for terranean application to the salt or saline seep area as represented by arrows 28 or be transported to a recharge area 12 as has heretofore been described. The concentrated brine as represented by line 60 may be recycled and added to the raw saline seep water as represented by block 40 or concentrated for additional treatment and isolation of further mineral compounds as has heretofore been discussed.

In accordance with the present combined method of mining and reclaiming land it has been found that magnesium can be removed from brackish water with only minimal additions of sodium hydroxide as will be discussed in the examples hereinafter in greater detail. The reverse osmosis unit is effectively utilized after pretreatment and may be a unit manufactured by Osmonics, Inc. of Hopkins, Minn. or unit manufactured by Allied Water Corp. of San Francisco, Calif. Alternatively ion exchange, which will be discussed hereinafter in greater detail or electrodialysis may be advantageously employed after pretreatment to purify the water to potable condition. Electrodialysis units are available on the market and can be purchased from Ionics, Inc. of Watertown, Mass.

Referring now to FIG. 3, a process for the recovery of magnesium from the magnesium hydroxide precipitate of FIG. 2 is illustrated. The magnesium hydroxide as represented by block 48 is placed into a settling tank 80 and is subsequently filtered through a filter 82 to which filtrate hydrochloric acid represented by block 84 is added to form a magnesium chloride solution as represented by block 86. The magnesium chloride solution is then dried in a dryer as represented by block 88 and introduced into an electrolytic cell as represented by block 90 and thereafter converted to magnesium metal and chlorine gas. The mining of Magnesium metal from the raw saline seep water is economically justifiable since sea water which has been traditionally utilized to mine magnesium contains only approximately 1,300 milligrams per liter of magnesium while the brackish waters collected from the saline seeps have magnesium contents of from about 2,500 to 7,000 ml. per liter. The saline brines contain in addition to magnesium minable quantities of calcium sulfate or gypsum to provide byproducts that can be mined from the saline seep water before the water is purified and re-circulation back to the land or discharged into rivers and streams.

The pretreatment removal of the magnesium and calcium sulfate assists not only in providing more effective reverse osmosis but also allows less retention time in the reverse osmosis unit and less fouling. However, in the case of pre-treatment careful pH and sodium hydroxide control is necessary to insure the quality of the purified magnesium hydroxide precipitate. The removal of the magnesium hydroxide precipitate assists in allowing the reverse osmosis unit to be smaller and run more economically and in an alternative embodiment allows the utilization of a smaller ion exchange unit which may be substituted for the reverse osmosis unit. An ion exchange system would utilize a two resin bed preferably employing a strong acid such as hydrochloric acid and a weak base combination such as ammonia. The causticization of ammonia chloride will occur with magnesium oxide followed by the hydrolysis of magnesium chloride in a recycle loop. Thermal energy could be utilized to recover ammonia and hydrochloric acid for reuse and the solid waste salts then recovered rather than a brine stream. Typical equations for an ion exchange flow system would be as follows:

Exhaustion of Ion-Exchange Bed:

$$NaCl(ag) + RSO_3H^+ \longrightarrow RSO_3Na^+ + HCl(ag)$$

$$HCl(ag) + R_3N \longrightarrow R_3NH^+Cl^- + H_2O$$

Regeneration of Ion-Exchange Bed:

$$HCl(ag) + RSO_3Na^+ \longrightarrow RSO_3H^+ + NaCl(ag)$$

$$NH_3(ag) + R_3HN^+Cl \longrightarrow R_3N + NH_4Cl(ag)$$

Reagent Recovery-Hydrolysis of Magnesium Chloride:

$$MgCl_2 \xrightarrow{\text{Thermal Decomposition}} HCl(g) + MgO(s)$$

$$MgO(s) + H_2O \longrightarrow Mg(OH)_2(ag)$$

$$NH_4Cl(ag) + Mg(OH)_2(ag) \longrightarrow NH_3(g) + MgCl_2(ag)$$

HCl is absorbed and recycled to regenerate the strong acid resin. $NH_3$ is absorbed and recycled to regenerate the weak base resin. $MgCl_2$ is recycled to recover $NH_3$.

In a further embodiment of the invention the pretreated water could be purfied to its final potable condition by the use of electrodialysis wherein a membrane is utilized in which an electrical charge forces all of the positive ions through one membrane filter and an opposite electrical charge forces all the negative anions through the other filter leaving clean water in the middle. Such units like reverse osmosis units are compact and utilize electricity to return the water to a purified condition.

A number of samples have been collected and analyzed in various regions in Montana in accordance with the combined method of mining and reclaiming land. Collected waters have been analyzed, treated, and tested for return to the land utilizing the combined method of the present invention. The results of these tests and analysis are set forth in the following Examples.

EXAMPLE 1

In this Example a sample of saline seep water was collected and tested from the Highwood Bench area in Montana. The analysis of this sample revealed the following elements and concentrations.

| | |
|---|---|
| Total Dissolved Solids | 49,700 mg/l |
| Chlorides | 2.37 mg/l |
| Sulfates | 36,800 mg/l |
| Bicarbonate as Calcium carbonate | 890 mg/l |
| Calcium | 400 mg/l |
| Magnesium | 3,360 mg/l |
| Sodium | 9,160 mg/l |
| Potassium | 41.0 mg/l |

EXAMPLE 2

A portion of the sample of the raw saline seep of Example 1 was analyzed for specific conductance and precipitated with sodium hydroxide. Results of the precipitation and percentage analysis of the major elements present in the raw saline seep precipitate as filtered are as follows:

| Analysis | |
|---|---|
| Specific Conductance | 30,500 μmho/cm |
| Magnesium | 2,560 mg/liter |
| Calcium | 189 mg/liter |
| Sulfate | 40,000 mg/liter |
| % Analysis | |
| Sodium | 9.72% |
| Magnesium | 19.13% |
| Calcium | 0.48% |
| Sulfate | 31.62% |

EXAMPLE 3

In this Example a portion of the sample collected from Example 1 was subjected to reverse osmosis to yield a concentrated brine and fresh water. The concentrated brine had the following analysis.

| Analysis | |
|---|---|
| Specific Conductance | 46,500 μmho/cm |
| Total Dissolved Solids | 124,000 mg/liter |

-continued

| Analysis | |
|---|---|
| Sodium | 23,400 mg/liter |
| Magnesium | 7,000 mg/liter |
| Calcium | 266 mg/liter |
| Sulfate | 92,000 mg/liter |

The potable water produced from the reverse osmosis unit when analyzed provided the following analysis:

| Analysis | |
|---|---|
| Specific Conductance | 960 μmho/cm |
| Total Dissolved Solids | 665 mg/liter |
| Sodium | 220 mg/liter |
| Magnesium | 18.6 mg/liter |
| Calcium | 1.57 mg/liter |
| Sulfate | 420 mg/liter |

EXAMPLE 4

In this Example a 50% concentrate of the brine solution of Example 3 was treated with sodium hydroxide to recover the major elements which were separated out of the raw saline seep water of Example 1 by reverse osmosis. The results of this treatment of concentrated brine obtained by reverse osmosis were as follows:

| Analysis | |
|---|---|
| Magnesium | 2,140 mg/liter |
| Calcium | 540 mg/liter |
| Sulfate | 70,000 mg/liter |
| % Analysis | |
| Sodium | 14.09% |
| Magnesium | 17.39% |
| Calcium | 0.30% |
| Sulfate | 36.06% |

EXAMPLE 5

It has been found that by utilizing a stronger concentration of sodium hydroxide than was utilized in Example 2 and by allowing the sodium hydroxide more time to react with the magnesium produces a greater percentage of magnesium hydroxide precipitating from the raw saline seep of Example 1. In this Example, the treatment of the raw saline seep of Example 1 precipitated 21.43% of the magnesium as magnesium hydroxide.

The combined mining and land reclamation method of the invention allows land to be reclaimed by the combination of mining and land reclamation procedures that accommodate the amount of salinity in the swale and the water discharged from the recharge area in combination with topological characteristics of the saline seep for simultaneously mining and reclaiming agricultural land. The combined method of the present invention is not ecologically destructive of the land but instead provides for a lasting improvement of the land by providing proper drainage after the mining aspects of the land are completed and thereby preventing further deterioration of the land. The method of the present invention contemplates the comparison of subterranean water salinity characteristics with the terrainean salinity through periodic measurements of the conductivity of soil in the seep area to maintain and improve the agricultural characteristics of the land. The versatility of the present invention allows for minimal disruption of existing crops by taking into account the precise nature of the soil characteristics in the saline seep area to collect and utilize the subterrean water channels that are responsible for the formation of saline seep.

As will be recognized by those skilled in the art the present invention is also applicable to non arable lands where alkali and alkaline earth metals have destroyed the land for farm production purposes. In these environments the present method of utilizing terranean and subterranen waters to control and vary the characteristic of the land and the proper selection of vegetation can be utilized for transforming the area into arable land.

The novel method of the present invention provides lasting advantages in the utilization of a drainage system to remove subterranean salts and minerals that might otherwise be wasted or ruin good agricultural land. In addition, the utilization of the drainage tile for both the mining and agricultural aspects of land reclaimation provides for better root foundations for existing crops and allows marginally productive land to increase its productivity and yields of grain crops and other types of crops not resistant to saline soil conditions.

As will be recognized by those skilled in the art, the present invention has a wide range of applicability to mining various types of minerals and for the return of non arable land to arable agricultural conditions by utilizing a wide variety of chemical processing and treatment techniques for the removal of salts and minerals that would otherwise contaminate or interfere with the purposes and uses of the land. The invention may be implemented in a variety of ways utilizing both mining and agricultural technique such as the utilization of various types of crops compatible with the land reclaimation and mining aspect of the invention in the stages of development of the land from mining to agricultural purposes.

It will further be appreciated that the present invention may be implemented in a variety of ways to suit the particular requirements of soil conditions, mining conditions, and agricultural purposes and uses of the land in achieving the proper combination of terranean and subterranean drainage techniques necessitated by the characteristics of the land both during and after the mining aspects of the present invention have been completed. Consequently, it is intended that these and other modifications and applications of the invention to a variety of conditions may be made within the spirit and scope of the invention as defined in the following claims.

What is claimed is:

1. A method for mining and reclaiming land comprising:
   (a) installing subterranean drain pipe to collect subterranean water;
   (b) periodically measuring the salinity of the soil at the site of the installation of said subterranean drain pipe to ascertain the feasibility of simultaneous crop production with the collection and purification of said subterranean water at said site and to determine the purity of the water to be returned to said site;
   (c) periodically comparing the measurement of salinity of said collected subterranean water with a measurement of said salinity of said soil at said site to determine if the primary source of said salinity in said collected subterranean water is the result of said salinity of said soil or the salinity of underground water received from a recharge area;
(d) purifying said water by removing calcium and magnesium salts from said subterranean water; and
(e) recycling said water back to the surface of the land at either said site of the installation of said subterranean drain pipe or to a recharge area or a combination thereof as a result of said determination of salinity.

2. The method for mining and reclaiming land of claim 1 wherein said step of purifying said subterranean water further includes the step of chemically treating said subterranean water with sodium hydroxide to precipitate said calcium and magnesium salts.

3. The method for mining and reclaiming land of claim 2 wherein said step of treating said subterranean water with said sodium hydroxide further includes a prior treatment of said subterranean water with a combination of sodium carbonate and sodium hydroxide to precipitate calcium as calcium carbonate before treating the filtrate with additional sodium hydroxide to remove magnesium salts as magnesium hydroxide.

4. The method of mining and reclaiming land of claim 3 wherein said step of purifying said subterranean water further includes the treatment of the resulting filtrate after the precipitation of said magnesium hydroxide with calcium hydroxide and sodium carbonate to remove excess calcium.

5. The method of mining and reclaiming land of claim 4 wherein said step of purifying said subterranean water further includes the application of reverse osmosis to said filtrate after the removal of said excess calcium.

6. The method of mining and reclaiming land of claim 5 further comprising the step of selecting and planting a crop at said site after the step of comparing the measurement of salinity of said collected subterranean water with the measurement of the salinity of the soil at the site of the installation of said subterranean drain pipe.

7. The method of mining and reclaiming land of claim 6 wherein said measurement of said salinity of said soil and selecting said crop is based upon the salinity of said soil as measured by specific conductance measurements compared to specific conductance measurements for particular crops.

8. The method of mining and reclaiming land of claim 6 wherein said subterranean drain pipe is installed at a depth of from about four to six feet in a swale area.

9. The method of mining and reclaiming land of claim 4 wherein said step of purifying said subterranean water further includes the application of ion exchange to said filtrate after the removal of said excess calcium.

10. The method of mining and reclaiming land of claim 4 wherein said step of purifying said subterranean water further includes the application of electrodialysis to said filtrate after the removal of said excess calcium.

11. A process for simultaneously mining and reclaiming land comprising:
(a) disposing subterranean drain pipe in a swale area to collect subterranean waters flowing from a recharge area of land disposed at an elevation higher than said swale and percolating waters topically applied and flowing down from the surface of said swale;
(b) periodically measuring the salinity of the soil in the swale area;
(c) periodically comparing the salinity of the collected waters with measurements of salinity of the soil in said swale area to determine if the source of salinity in said collected subterranean waters is the result of said salinity of the soil or the salinity of underground water received from said recharge area;
(d) mining ssid collected waters by removing dissolved minerals; and
(e) recycling said collected waters back to the surface of said land at said swale or said recharge area or a combination thereof in response to said determination of said source of said salinity in said collected waters.

12. The process for simultaneously mining and reclaiming land of claim 11 further comprising the steps of selecting and planting salt resistant plants in said swale.

13. The process for simultaneously mining and reclaiming land of claim 12 further comprising the step of mining said collected waters to a conductance of less than 16,000 micromhos per centimeter.

14. The process for simultaneously mining and reclaiming land of claim 11 further comprising the step of adding wetting agents to said collected waters after said step of mining and before recycling said water back to the surface of said land.

15. The process for simultaneously mining and reclaiming land of claim 11 wherein said step of mining comprises a step of collecting said waters in settling tanks and treating said collected waters with sodium hydroxide and sodium carbonate to first precipitate calcium carbonate.

16. The process for simultaneously mining and reclaiming land of claim 15 wherein said step of mining includes after said step of precipitation of calcium carbonate the removal of the mother liquid to a further settling tank that is treated with sodium hydroxide to precipitate magnesium hydroxide.

17. The process for simultaneously mining and reclaiming land of claim 16 wherein said step of mining includes after said step of precipitation of magnesium hydroxide the removal of the mother liquid to a further settling tank that is treated with lime to precipitate calcium sulfate.

18. The process for simultaneously mining and reclaiming land of claim 17 wherein said step of mining includes after said step of precipitation of calcium sulfate the removal of the mother liquid to a further settling tank that is treated with sodium carbonate to precipitate excess calcium as calcium carbonate.

19. The process for simultaneously mining and reclaiming land of claim 18 further comprising the step of purifying said collected water before the step of recycling said water after the precipitation of calcium carbonate by applying reverse osmosis to said liquid.

20. The process for simultaneously mining and reclaiming land of claim 19 wherein said purified water is returned to the surface of said swale.

21. The process for simultaneously mining and reclaiming land of claim 20 wherein subterranean waters are collected from said recharge area before reaching the top soil of said swale to prevent saline seep while said purified water is returned to the surface of said swale.

22. The process for simultaneously mining and reclaiming land of claim 21 wherein said purified water returned to the surface of said swale have specific conductivities of less than 2,250 micromhos per centimeter.

23. The process for simultaneously mining and reclaiming land of claim 21 wherein said subterranean drain pipe is disposed in said swale area at a depth of from about 4 to 6 feet.

24. A method of mining salt laden glacial till while reclaiming a swale for agricultural purposes comprising:
(a) installing drain pipe in a saline seep area for collecting subterranean water flowing from an upland recharge area relative to said saline seep area and terranean water deposited at the surface and percolating down from the surface of said saline seep area;
(b) collecting said subterranean and said terranean water and mining said water by removing its dissolved minerals;
(c) purifying said subterranean and terranean collected water after mining; and
(d) growing a crop on the surface of said saline seep area while collecting and mining said collected water.

25. The method of mining salt laden glacial till while reclaiming a swale for agricultural purposes of claim 24 wherein said step of mining said collected water includes the step of pretreating said collected water with sodium hydroxide to form a preciptiation of excess minerals.

26. The method of mining salt laden glacial till while reclaiming swale for agricultural purposes of claim 25 wherein said step of purifying said collected water includes the application of ion exchange to said collected water after said precipitation of excess minerals from said collected water after a pretreatment with sodium hydroxide.

27. The method of mining salt laden glacial till while reclaiming swale for agricultural purposes of claim 25 wherein said step of purifying said collected water includes the application of electrodialysis to said collected water after said precipitation of excess minerals.

28. The method of mining salt laden glacial till while reclaiming swale for agricultural purposes of claim 25 wherein said step of purifying said collected water includes the application of reverse osmosis to said collected water after said precipitation of excess minerals.

29. The method of mining salt laden glacial till while reclaiming swale for agricultural purposes of claim 18 further comprising the return of purified water to the surface of said saline seep area.

30. The method of mining salt laden glacial till while reclaiming swale for agricultural purposes of claim 29 further comprising the addition of wetting agents to said purified water before returning said purified water to the surface of said saline seep area.

31. The method of mining salt laden glacial till while reclaiming swale for agricultural purposes of claim 28 further comprising the step of periodically measuring the salinity of the soil in the saline seep area and selecting said crop based upon said salinity measurement of said soil and the resistivity of said crop to salinity.

32. The method of mining salt laden glacial till while reclaiming swale for agricultural purposes of claim 31 further comprising the step of periodically measuring the salinity of said collected water and comparing said salinity with said salinity of said soil in said saline seep area to determine whether the primary source of salinity in said collected water is from said soil in said saline seep area or from said subterranean water flowing from said recharge area.

33. The method of mining salt laden glacial till while reclaiming swale for agricultural purposes of claim 32 wherein said purified water is recycled to said recharge area or said saline seep area based upon said comparison of salinities and the resistivity of said crop to salinity.

* * * * *